July 30, 1957  A. STAUDT  2,800,667
SAFETY LIFEBOAT RELEASE GEAR
Original Filed Jan. 20, 1954  3 Sheets-Sheet 1
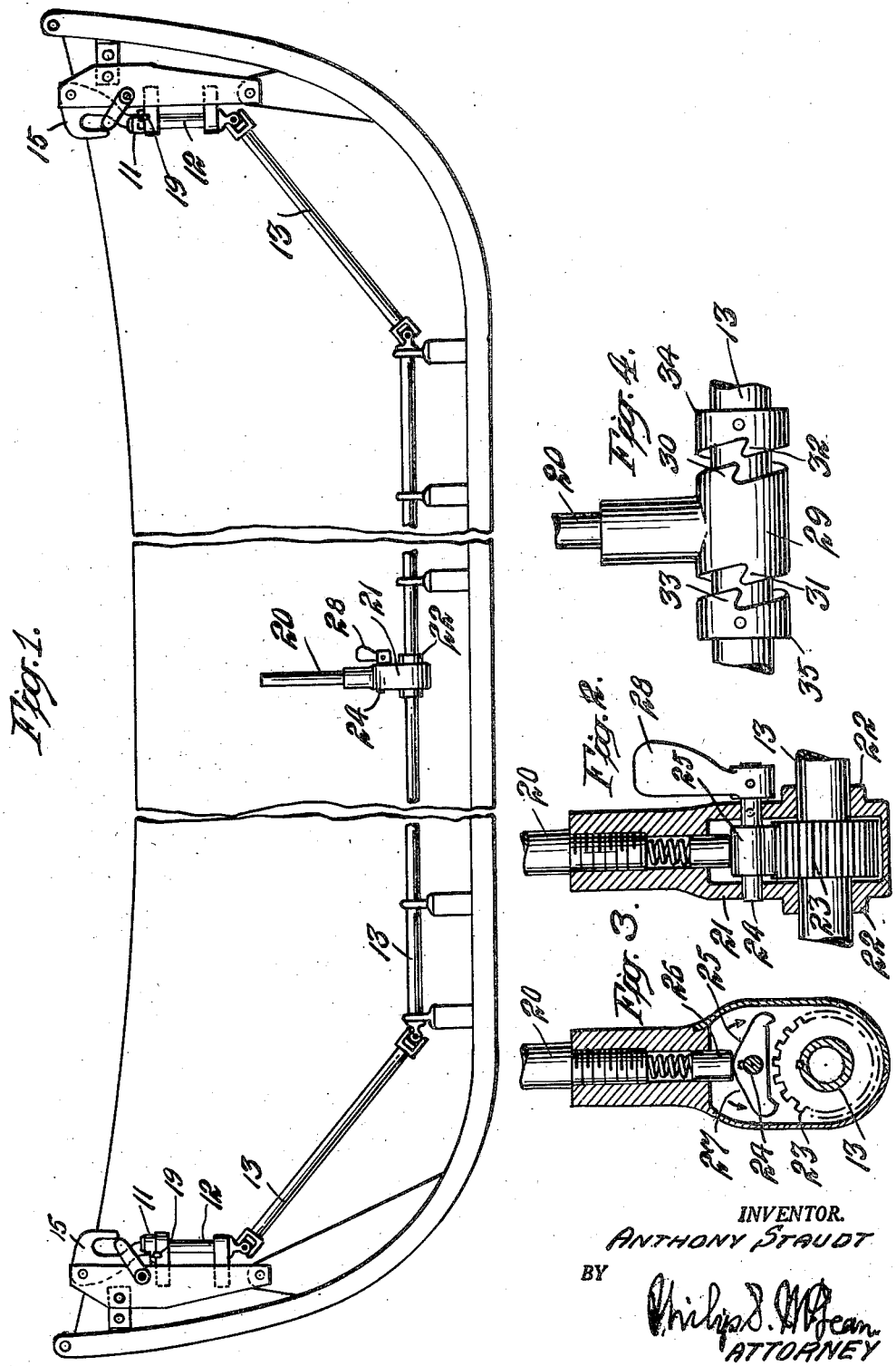
INVENTOR.
ANTHONY STAUDT
BY
ATTORNEY

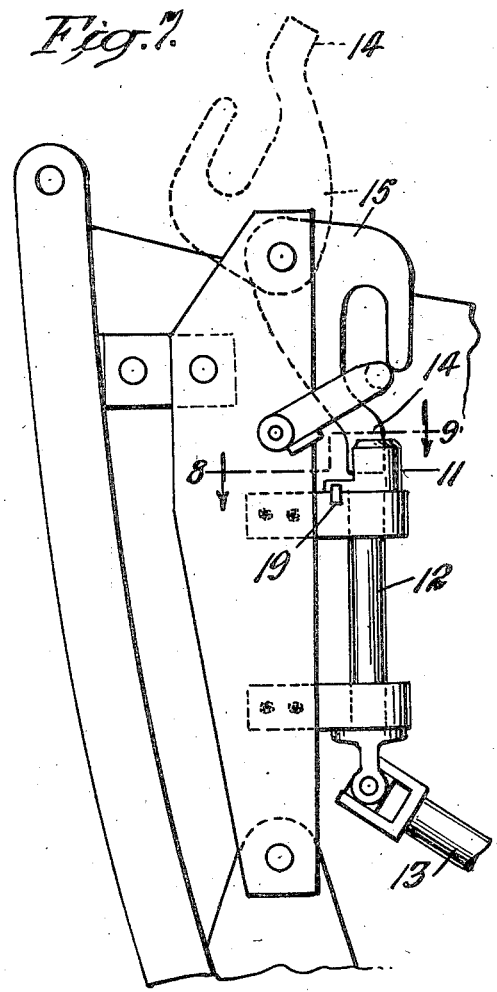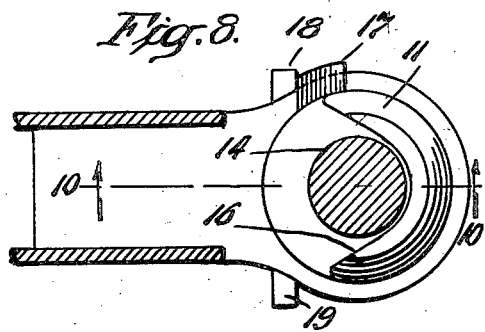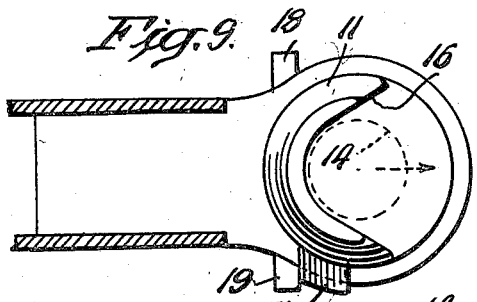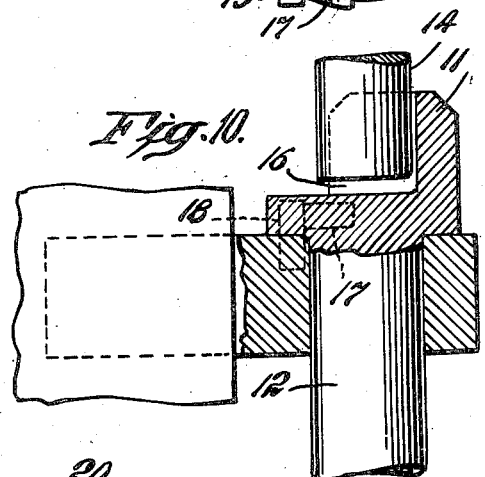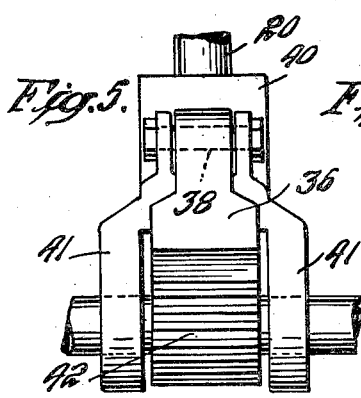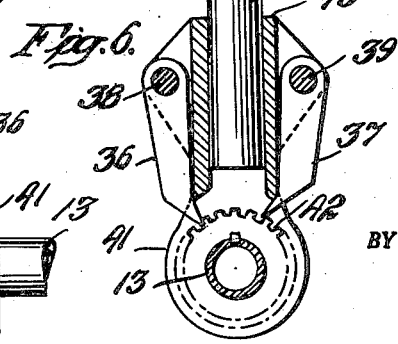

July 30, 1957  A. STAUDT  2,800,667
SAFETY LIFEBOAT RELEASE GEAR
Original Filed Jan. 20, 1954  3 Sheets-Sheet 3

INVENTOR.
ANTHONY STAUDT,
BY
ATTORNEY

United States Patent Office 2,800,667
Patented July 30, 1957

2,800,667

SAFETY LIFEBOAT RELEASE GEAR

Anthony Staudt, Howard Beach, N. Y.

Continuation of application Serial No. 405,080, January 20, 1954. This application January 3, 1956, Serial No. 557,067

2 Claims. (Cl. 9—45)

The invention herein disclosed relates to the gear for releasing lifeboats from the boat falls and particularly to the Rottmer type gear shown in Patents 515,021 of February 20, 1894, 998,263 of July 18, 1911 and 2,368,728 of February 6, 1945, in which supporting hooks at opposite ends of the boat are held closed by clutches which can be turned to simultaneously release the hooks by means of connecting shafting in the bottom of the boat. This shafting is rotated to effect the release by a hand lever fixed to and projecting from the shafting.

The release clutches are in the form of cups or collars having upstanding, part circular walls to confine the hooks and having notches or gaps therein which when aligned therewith will permit the hooks to snap free.

The walls defining these notches are flared to permit quick, easy escape of the hooks. These flaring side walls, under pressure of the hooks, act as inclined cams enabling the hooks in their releasing movement to impart powerful turning impulse to the clutches, connecting shafting and hand lever.

As a consequence this projecting lever has always constituted an imminent source of danger causing injuries to operators, boats and equipment.

A further danger has been created by clutches not in exact synchronism, with one releasing the boat at one end and leaving the boat hung up at the other end.

It is a purpose of this invention to eliminate these dangerous conditions and to provide a fully safe, practical and efficient quick release gear.

Further special objects of the invention are to provide safety release gear which will not take up much room and can be installed where space is limited, which though relatively small in size may be used to apply all necessary force to release the gear, which can be positioned as may be most convenient to apply such releasing force and which in general will be more efficient and of advantage over release gear presently in service.

The foregoing and other desirable objects are attained by certain novel features of construction, combination and relation of parts and including in particular the provision of a release handle pivotally mounted on the clutch shafting and having a ratchet type of connection with the shafting so that it may be used to urge the shafting in the clutch releasing direction and so that the shafting when it is impulsed by the load at the beginning of the clutch opening movements will automatically free itself of the lever and continue turning through the full clutch releasing action, assuring release of both clutches without danger to boat or occupants.

Drawings accompanying and forming part of this specification illustrate present practical embodiments of the invention. Structure, however, may be modified and changed as regards the immediate illustration, all within the intent and scope of the invention as hereinafter defined and claimed.

Fig. 1 in these drawings is a broken longitudinal diagrammatic view illustrating an embodiment of the safety release gear in a lifeboat;

Fig. 2 is an enlarged broken sectional view showing the release handle loosely swivelled on the shaft and carrying a spring pressed pawl which can be rocked either way into engagement with gear or ratchet teeth on the shaft;

Fig. 3 is a broken sectional view of these same parts as taken on a plane at right angles to that of Fig. 2;

Fig. 4 is a broken part sectional detail showing a modified form of release handle swivelled on the shaft and having reversely faced clutch jaws at opposite ends engageable with coacting, reversely faced jaw clutch collars on the shaft;

Figs. 5 and 6 are broken part sectional detail views generally similar to Figs. 2 and 3, illustrating another form of double ratchet release gear;

Figure 11:
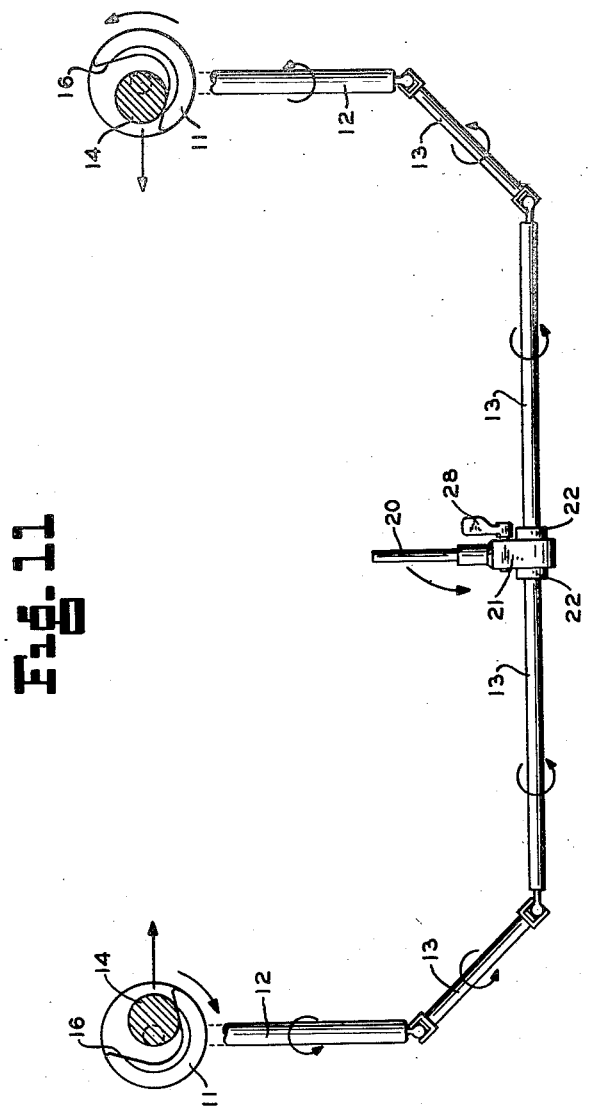

Figs. 7, 8, 9 and 10 are broken and part sectional views of one of the rotatable cup clutches, Figs. 8 and 9 being taken on substantially the plane of line 8—9 of Fig. 7 and Fig. 10 being taken on substantially the plane of line 10—10 of Fig. 8.

Fig. 11 is a diagrammatic view showing how the load carrying hooks in escaping from the clutches apply the turning effect to the shafting.

Fig. 1 illustrates boat release gear, typical to the extent of involving cup clutches or collars 11 carried by upright shafts 12 journaled at opposite ends of the boat and which can be turned by universally jointed shafting 13 journaled to extend along the bottom of the boat, said collars arranged in the positions shown in Figs. 1, 7, 8 and 10, to hold the tail portions 14 of the supporting hooks 15, and having open sides or gateways 16 to release the hooks when turned to the position shown in Fig. 9.

To prevent over-travel in either direction the clutch collars are shown as each having an extended and downwardly projecting lug 17 at the bottom of the same to contact fixed stops 18, 19 at the ends of travel in opposite directions, that is, at the ends of the fully closed and fully open travel positions, Figs. 8 and 9.

In the form of the invention shown in Figs. 1, 2 and 3, the release handle 20 is in the form of a lever having a housing 21 at the end of the same journaled at 22 on the shaft 13 at opposite sides of a gear or ratchet 23 keyed or otherwise fixed on the shaft.

Extending across the housing parallel with the shaft axis, is a small rock shaft 24 having a double ended dog or pawl 25 keyed or otherwise fixed on it, to clear the ratchet in a neutral, intermediate position, Fig. 3, or to engage the ratchet at either side of the center, when rocked one way of the other.

To yieldingly hold this double ended pawl in the neutral or in either of the two active positions, a spring pressed plunger 26 is shown disposed in the hollow of the handle and bearing on the center, humped portion 27, Fig. 3, of the double pawl.

The position of the pawl is controllable in the illustration by a small lever handle 28 fixed on the outer extended end of the shaft 24. This handle may carry suitable indications such as "Lift" and "Release" on opposite sides, or the handle housing may carry indications to show proper positions of the control handle for neutral and for lifting and lowering. Also, if desired, a spring detent or the like may be provided for yieldingly retaining the control handle in neutral or possibly in the other two, active positions.

In this form of the invention all active parts are enclosed within the housing portion of the handle and can be kept sealed in a properly lubricated condition, free to operate when called upon.

Fig. 4 illustrates a simplified form of the invention in which the release handle 20 is provided at the end with a collar 29 loosely sleeved over the shaft and shiftable longitudinally thereon to carry oppositely faced clutch jaws 30, 31 into engagement with the companion, oppositely faced clutch jaws 32, 33 on collars 34, 35 fixed on the shaft, spaced from the ends of the sleeve.

In the form of the invention shown in Figs. 5 and 6, pawl 36, 37 are pivoted at 38, 39 on opposite sides of a yoke 40 having parallel arms 41 journaled on the shaft at opposite sides of the gear or ratchet 42. The handle 20 is fixed in the outer end of this yoke to rock the yoke in opposite directions and the pawls, by reason of their pivotal mounting in the yoke, may either or both be swung up into an inactive position, or down into the active position shown in Figs. 5 and 6, for engagement with the ratchet.

In all forms of the invention illustrated the release handle may be left free of the shaft so that any accidental touching of the handle will not disturb the clutches holding the boat in supported relation.

If desired, however, the handle may be left coupled to the shaft so that it may be utilized instantly to rotate the shaft in the boat fall releasing direction.

Ordinarily it may be preferred to leave the release handle free in the neutral position and to shift to the release position only when it is desired to release the boat. This can be effected in the first illustrated form by simply throwing the control handle 28 over to release position, in which case the double ended pawl will be rocked to return the shaft in the clutch releasing direction when the release handle 20 is raised.

In the Fig. 4 form of the invention the release handle may be coupled to the shaft to effect boat releasing action of the latter by sliding it in the direction indicated to couple it up with the proper one of the two collars 33, 34.

In the form of the invention illustrated in Figs. 5 and 6 the release handle is coupled to the shaft for boat releasing purposes by simply throwing down that one of the two pawls 36, 37 which is designated as the one to effect turning of the shaft in the releasing direction.

The fulcruming of the release handle on the clutch operating shaft provides leverage enabling turning of that shaft with little effort and facilitating break-away in case of the shaft or other parts sticking from rust or other impediment. And the leverage thus provided enables use of a relatively short lever handle which may ordinarily be out of the way and take up but small space in the boat.

While the quick, immediate, simultaneous release of the clutches might be considered the most essential, the sure, positive closing of the clutches is necessary and important. The invention assures both. By reason of the double ratchet connection the shaft can be turned equally as well in both directions and this can be done with entire safety because in the releasing movement the instant the shaft begins to turn under its own power by reason of the load, the ratchet teeth will automatically disengage from the pawl, permitting the shaft to continue its rotation, leaving the handle free and preventing the dangerous whipping movement of the handle present in prior constructions.

The double ratchet connection between the handle and shaft is of advantage also in that it enables the locating of the handle at the most favorable angle for turning or, if desired, for holding the shaft against turning.

The extra leverage afforded through the ratchet connections so facilitates the turning action that the clutches might easily be turned too far in either the locking or unlocking direction, and this factor renders the clutch stops 17, 18, 19 of importance. Thus, as much power as may seem necessary may be applied without the danger of in-turning the clutch collars too far. Also, this means that the release handle may be operated in either direction even though the crewman may be in a position to observe the turning movement of the clutch collars. It is only necessary then to swing the release handle in the closing or opening direction just as far as it will go.

The double form of pawl and ratchet construction shown in Figs. 5 and 6 in some instances may be preferred because of simplicity and low cost. Spring detents or equivalent may be provided in this form for releasably holding either or both the pawls in the active or inactive position.

Another important feature of the invention is that the release handle may be raised or lowered independently of the shafting to locate it at the best or most convenient or most favorable angle for ratcheting the shaft.

Fig. 11 shows in a diagrammatic way how the tail extensions 14 under loading of the hooks, acting against the inclined cam faces of the notches 16, will apply rotational effect to the clutches as soon as these extensions begin their releasing movement, and to increasing extent as they slide outwardly over the inclined cam faces. This powerful turning impulse imparted to the shaft uncouples the shaft from the operating handle and completes the boat releasing operation independently of the handle and while leaving the handle free and under no strain in the hands of the operator.

Thus the power impounded in the shaft instead of being there as a source of danger, is utilized and made use of to effect quick detachment of the boat from the falls. If one clutch is slightly ahead of the other, the first released will assist and assure release of the second.

This application is a continuation of application Serial No. 405,080, filed January 20, 1954 now abandoned.

What is claimed is:

1. Boat releasing equipment comprising in combination, a boat, releasable hooks pivoted to the opposite ends of the boat with rotatable cup clutch means operatively connected to said hooks, rotatable shaft means connected to said cup clutches including a pair of upright rotatable shaft means connected to said cup clutches for actuating same in unison to effect rotation of said clutches, safety release gear comprising housing means journaled on and intermediate the opposite connecting ends of said rotatably mounted shaft means, ratchet means fixed on said shaft within said housing, a rock shaft journaled in said housing over said ratchet means and in parallel relationship to said rotatably mounted shaft, double ended pawl means mounted on said rock shaft, handle means fixed on one end of said rock shaft to shift said pawl means into and out of cooperative engagement with said ratchet means whereby said housing may be left normally free from the shaft and ineffective to actuate the clutches, and a hand lever projecting from the top of said housing operable to oscillate the housing about the shaft in either direction and to occupy a position freed of the shaft where it will normally remain in a non-releasing state when not required for releasing or closing the boat release clutches, said ratchet means and cooperating pawl means being faced to permit free rotation of the shaft connecting the clutches in the clutch releasing direction.

2. Safety release gear for lifeboats comprising in combination, a boat, releasable hooks pivoted to the opposite ends of the boat, cup clutch means operatively connected to said hooks, rotatable shaft means for rotating said cup clutches including a pair of upright rotatable shaft means connected to said cup clutches, the upright shafts being mounted at opposite ends of the boat, and a rotatably mounted main shaft means connected at its opposite ends to each bottom end of said upright shaft means for actuating the upright shaft means in unison to effect rotation of said clutch means, said means including a hand lever loosely sleeved on said main shaft means and pawl and one way ratchet connecting means between said hand lever and shaft faced to positively engage only in the direction of releasing movement of the shaft whereby said handle may be rocked on the shaft to start it in the clutch releasing direction by ratcheting action in the clutch releasing direction of movement and whereby said shaft impulsed by the hooks in starting their reelasing movement through the notches may continue rotary movement under power applied by one or the other or both clutches to complete releasing action of the hooks while leaving the hand lever at rest.

References Cited in the file of this patent
UNITED STATES PATENTS

| | | | |
|---|---|---|---|
| 292,666 | Mansfield | Jan. 29, | 1884 |
| 376,584 | Cone | Jan. 17, | 1888 |
| 515,021 | Rottmer | Feb. 20, | 1894 |